United States Patent [19]

Inui et al.

[11] Patent Number: 4,685,069

[45] Date of Patent: Aug. 4, 1987

[54] HEAT STORAGE CORRECTION APPARATUS

[75] Inventors: Toshiharu Inui; Haruhiko Moriguchi; Masayuki Hisatake; Takashi Ohmori, all of Kanagawa, Japan

[73] Assignee: Fuji Xerox Co., Ltd, Tokyo, Japan

[21] Appl. No.: 684,787

[22] Filed: Dec. 21, 1984

[30] Foreign Application Priority Data

Dec. 23, 1983 [JP] Japan .............................. 58-242113

[51] Int. Cl.⁴ .......................................... G01D 15/10
[52] U.S. Cl. ................................. 364/506; 346/76 PH
[58] Field of Search ....................... 364/506, 518, 519; 346/76 PH; 250/318, 317.1; 400/120; 219/216 PH

[56] References Cited

U.S. PATENT DOCUMENTS 4,415,808 11/1983 Sugiura .......................... 346/76 PH
4,607,262 8/1986 Moriguchi et al. ............ 346/76 PH Primary Examiner—Arthur G. Evans
Attorney, Agent, or Firm—Finnegan, Henderson, Farabow, Garrett and Dunner

[57] ABSTRACT

A heat storage correction apparatus and method determines the degree of solidity of a picture data to be recorded and increases the quantity of energy supplied to data elements recording substantially solid portions of the picture elements.

12 Claims, 14 Drawing Figures $T_i$ (m mS)

| $X_i$ \ $X_{i-1}$ | 0 | 1 | 2 | 3 | 4 | 5 | 6 | 7 | 8 | 9 | 10 |
|---|---|---|---|---|---|---|---|---|---|---|---|
| 0 | 1.0 | 1.0 | 1.0 | 0.9 | 0.8 | 0.8 | 0.7 | 0.7 | 0.6 | 0.6 | 0.6 |
| 1 | 1.0 | 1.0 | 1.0 | 0.9 | 0.8 | 0.8 | 0.7 | 0.7 | 0.6 | 0.6 | 0.5 |
| 2 | 1.0 | 1.0 | 0.9 | 0.9 | 0.8 | 0.7 | 0.7 | 0.6 | 0.6 | 0.6 | 0.5 |
| 3 | 0.9 | 0.9 | 0.9 | 0.8 | 0.7 | 0.7 | 0.7 | 0.6 | 0.6 | 0.5 | 0.5 |
| 4 | 0.9 | 0.9 | 0.8 | 0.8 | 0.7 | 0.7 | 0.6 | 0.5 | 0.5 | 0.5 | 0.4 |
| 5 | 0.8 | 0.8 | 0.8 | 0.7 | 0.7 | 0.6 | 0.6 | 0.5 | 0.5 | 0.4 | 0.4 |
| 6 | 0.8 | 0.7 | 0.7 | 0.7 | 0.7 | 0.6 | 0.6 | 0.5 | 0.5 | 0.4 | 0.4 |
| 7 | 0.7 | 0.7 | 0.7 | 0.6 | 0.6 | 0.6 | 0.5 | 0.5 | 0.4 | 0.4 | 0.4 |
| 8 | 0.6 | 0.6 | 0.6 | 0.6 | 0.5 | 0.5 | 0.5 | 0.4 | 0.4 | 0.4 | 0.4 |
| 9 | 0.6 | 0.6 | 0.5 | 0.5 | 0.5 | 0.5 | 0.4 | 0.4 | 0.4 | 0.4 | 0.4 |
| 10 | 0.5 | 0.5 | 0.5 | 0.5 | 0.4 | 0.4 | 0.4 | 0.4 | 0.4 | 0.4 | 0.6 |

$T_i$ (in mS)

| $X_i$ \ $T_{i-1}$ | 1.0 | 0.9 | 0.8 | 0.7 | 0.6 | 0.5 | 0.4 | 0.3 |
|---|---|---|---|---|---|---|---|---|
| 0 | 1.0 | 0.9 | 0.8 | 0.7 | 0.6 | 0.5 | 0.4 | 0.3 |
| 1 | 0.9 | 0.8 | 0.8 | 0.7 | 0.6 | 0.5 | 0.4 | 0.3 |
| 2 | 0.8 | 0.8 | 0.7 | 0.6 | 0.5 | 0.4 | 0.4 | 0.3 |
| 3 | 0.8 | 0.7 | 0.6 | 0.6 | 0.5 | 0.4 | 0.3 | 0.3 |
| 4 | 0.7 | 0.6 | 0.6 | 0.5 | 0.4 | 0.4 | 0.3 | 0.3 |
| 5 | 0.6 | 0.5 | 0.5 | 0.4 | 0.4 | 0.3 | 0.3 | 0.3 |
| 6 | 0.5 | 0.4 | 0.4 | 0.4 | 0.3 | 0.3 | 0.4 | 0.3 |
| 7 | 0.6 | 0.6 | 0.6 | 0.6 | 0.6 | 0.6 | 0.6 | 0.6 |

HEAT STORAGE CORRECTION APPARATUS

BACKGROUND OF THE INVENTION

The present invention relates to a heat storage correction apparatus used for a recording device to make thermal records and for a display device using magnetized latent images.

A typical thermal head contains a number of heater elements which are ordinarily aligned to cause the heater elements to generate heat according to certain picture data. The thermal head generatgs a thermal pulse to record picture images in a thermosensitive recording or transfer system and to form magnetized latent images in a display device.

A recording or a display device employing a thermal head makes a record or display (hereinafter just referred to as "record") by using thermal energy. If the energy becomes excessive or insufficient, the density of the picture is adversely affected and the picture quality deteriorates. The risk of deterioration in picture quality becomes larger as the speed of recording the record density increases. It thus becomes necessary to adjust the picture quality to maintain it in good condition.

FIG. 1 shows a picture data arrangement for calculating the heat storage condition of a thermal head. Data row L1 designates the data on a line to be recorded. Data row L2 designates the data in the line previously recorded. Data rows L3-L5 designate respectively the data recorded in the four previous lines.

In data row L1, data D0, shown cross-hatched in FIG. 1, is referred to as "aimed data." D0 corresponds to the one heater element with respect to which printing processing is presently performed. The printing process refers to the calculation of applied energy to the element. Ten other data, D1-D10, are called "reference data" and are used for calculating the heat storage condition. In the group of reference data D1-D10, for example, D1 and D2, which correspond to heater elements adjacent to the heater element for the aimed data D0, may have relatively great influence on the printing of the aimed data D0. Alternatively, reference data D4, which corresponds to the same heater element on the previous data row L2, may have the greatest influence on the printing of the aimed data D0. Thus, each reference data which influences the heat storage data for printing the aimed data D0 may have different degrees of importance depending, for example, on the distance between heater elements or the printing intervals on each line.

A conventional system weights the respective reference data D1-D10 and adds the weighted data to calculate the heat storage condition. The weighting is as shown in the following Table 1.

TABLE 1

| Reference Data | Weight |
| --- | --- |
| D1, D2 | 70 |
| D3, D5 | 45 |
| D4 | 160 |
| D6, D8 | 17 |
| D7 | 100 |
| D9 | 60 |
| D10 | 36 |

The thermal energy needed to print the aimed data is determined in accordance with the heat storage data subjected to the weighted addition as described above. This is accomplished by adjusting the time width and the voltage of the pulse applied to the corresponding heater element of the thermal head.

FIG. 2 shows an example of a conversion function between the heat storage data and the applied pulse width in an apparatus in which the applied pulse width is varied to adjust the thermal energy. The abscissa indicates various heat storage data corresponding to sums of the reference data D1-D10 weighted on the basis of the Table 1. Those sums correspond to the heat storage data for the heater element corresponding to the aimed data D0. The sum is zero when all the reference data D1-D10 are non-printing data (white data), and has its maximum value 620 when all the reference data are printing data (black data). The ordinate represents the pulse width in milliseconds (ms).

In FIG. 2, if the heat storage data for the aimed data D0 at a certain point of time is, for example, 620, the applied pulse width is the shortest (0.3 ms) because the element's heat storage condition is greatest. If that condition is zero, the applied pulse width is the longest (0.5 ms).

The applied pulse width is not always determined only on the basis of this weighted sum, but in many practical cases the applied pulse width has been set by referring to the pulse width applied to record the preceding line. However, the basic principle is that the applied pulse width is set shorter as the heat storage data increases.

In using such a heat storage apparatus, however, sometimes the printing density is reduced or foggy when printing a solid black portion or a pattern portion which was substantially solid black (both hereinafter referred to as a "solid portion"). This occurs because the conventional heat storage correction apparatus is normally arranged to suit a printing pattern consisting of lines and/or dots, and too much heat correction is performed for a solid portion.

An object of the present invention is a heat storage correction apparatus for proper printing of even a solid portion.

SUMMARY OF THE INVENTION

According to the present invention, the heat storage correction apparatus for determining the amount of energy to be applied to a plurality of heater elements in a thermal head for recording picture data, the one of said elements for which the apparatus currently determines the amount of applied energy being called an aimed data element, comprises: means for storing recording states for the plurality of heater elements based on the picture data; means for calculating a heat storage status for the aimed data element from a first number of stored recording states; means for judging the degree of solidity in the region of said picture data surrounding the portion corresponding to the aimed data element by using the heat storage level, for adjusting the energy level to be applied to the aimed data element such that the energy level generally decreases with increasing solidity, and for increasing the energy level when the surrounding region is judged to be substantially solid; and means for setting the amount of energy for the aimed data element from the aimed data element energy level and the recording state for the aimed data element.

Only when the picture data status in a predetermined region surrounding a specific heater element about to perform its printing operation corresponds to the above-mentioned solid portion, is a correction made to increase the quantity of applied energy set in the energy adjusting means. For example, the following correction is desirable:

(1) The applied energy correction means is arranged such that the quantity of applied energy set in the energy adjusting means is corrected when the printing dot exclusive possession rate (i.e., the degree of "solidity" of the portion) is 100% in the predetermined region. That is, the correction of thermal energy is effected only for a completely solid black portion. Whether the region is solid black or not may be judged y checking the status of data in that region or by checking whether the heat storage status calculated by the heat storage status calculating means has its largest value.

(2) The applied energy correction means is arranged such that the quantity of applied energy set by the energy adjusting means is corrected when the printing dot exclusive possession rate is either 100% or a predetermined value close to 100%. This is because it may be preferable to perform correction when the printing dot exclusive possession rate takes a value other than 100% or when the size of the "predetermined reion" is relatively large. The judgment whether a portion is solid or not may be performed by two kinds of methods as described in paragraph (1).

The above-mentioned objects, features and advantages of the present invention will become more apparent from the following description in conjunction with the accompanying drawings.

BRIEF DESCRIPTION OF THE DRAWINGS

FIGS. 1 and 2 are diagrams for explaining the principle of a conventional heat storage correction apparatus in which:

FIG. 1 is an explanatory diagram showing the arrangement of picture data used in calculation of the heat storage status; and FIG. 2 is a control characteristic diagram showing the relationship between the extent of heat storage and the applied pulse width.

FIGS. 3–8 are diagrams for explaining an embodiment of the present invention, in which:

FIG. 3 is a block diagram showing the outline of the heat storage correction apparatus;

FIG. 4 is an explanatory diagram showing picture data in a reference region;

FIGS. 5 and 6 are explanatory diagrams showing the contents of the ROMs in the Xi calculator and applied pulse width calculator, respectively, shown in FIG. 3;

FIG. 7 is a diagram showing the portion of the applied pulse width setting section connected with the succeeding stage of this heat storage correction apparatus; and FIG. 8 is a time chart showing the generation of a set of applied pulses.

DESCRIPTION OF THE PREFERRED EMBODIMENT

Preferred embodiments according to the present invention are described in detail below.

Figure 3:
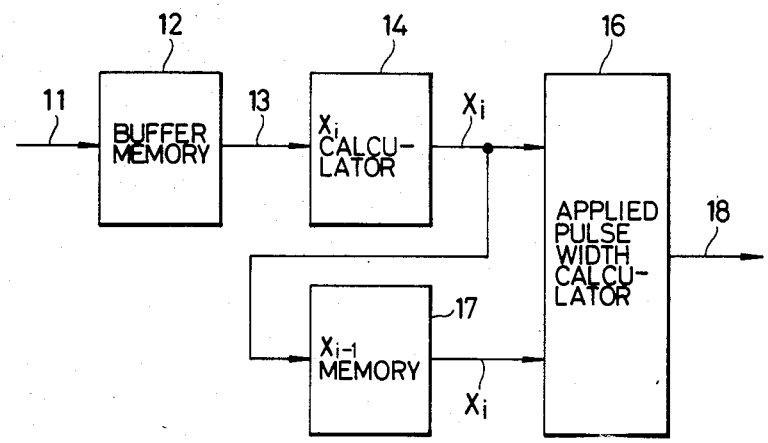

FIG. 3 illustrates the outline of the arrangement of the heat storage correction apparatus in a preferred embodiment of the present invention. The apparatus is provided with a buffer memory 12 for successively storing five lines of serial picture data 11. Reference data 13, for determining an applied pulse width for a specific one bit of picture data, is read out of the buffer memory 12.

Figure 1:
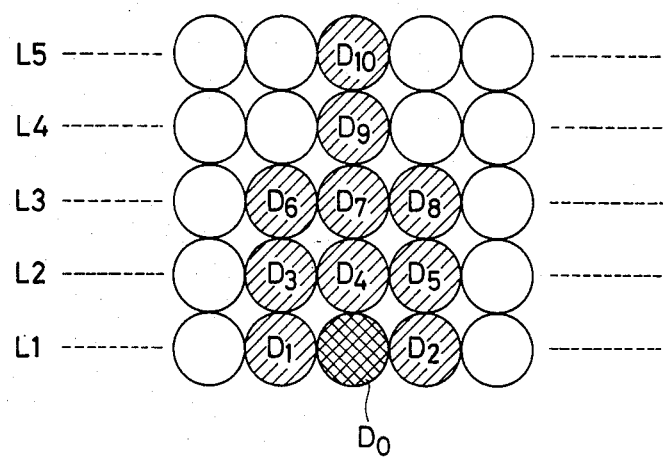
Figure 2:
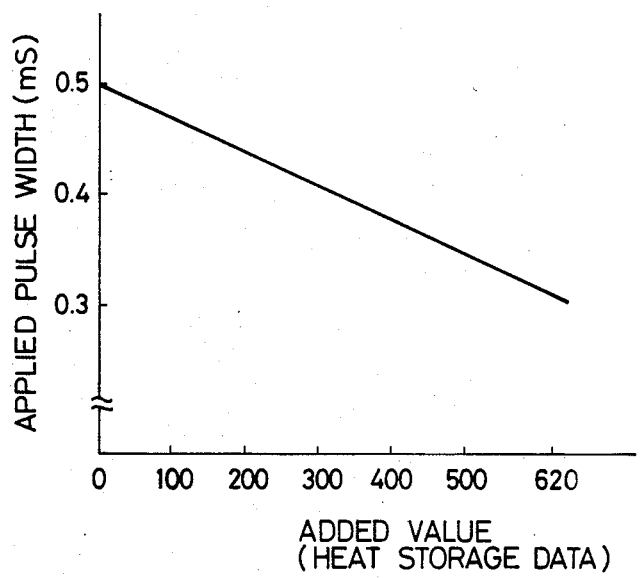
Figure 4:
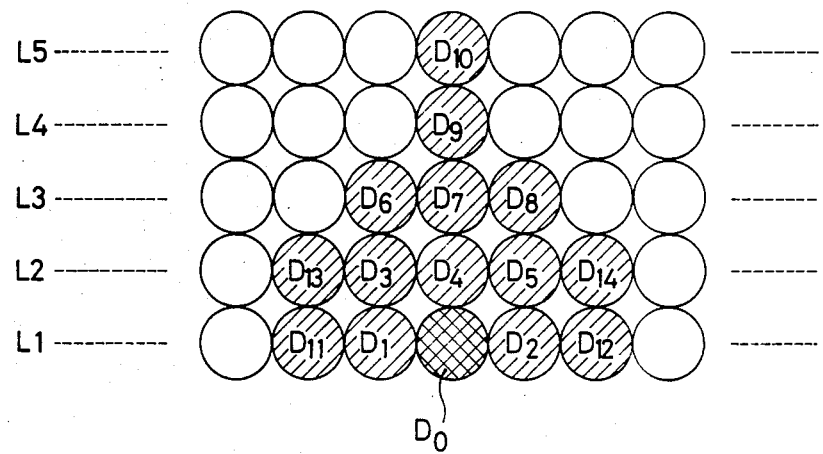

FIG. 4 illustrates the arrangement of aimed data and reference data in this embodiment. In comparing FIG. 4 with FIG. 1, it can be seen that four reference data D11–D14 have been added in FIG. 4. Two of the additional reference data, D11 and D12, are adjacent to the reference data D1 and D2 in the first row L1, and two other additional reference data, D13 and D14, are adjacent to the reference data D3 and D5 in the second row L2. The weight of each reference data is as shown in Table 2.

TABLE 2

| Reference Data | Weight |
| --- | --- |
| D1, D2 | 70 |
| D3, D5 | 45 |
| D4 | 100 |
| D6, D8 | 20 |
| D7 | 67 |
| D9 | 40 |
| D10 | 29 |
| D11, D12 | 10 |
| D13, D14 | 5 |

Xi calculator 14 in FIG. 3 includes an adder for classifying the heat storage status by heat storage levels. Calculator 14 calculates for the aimed data the sum of reference data D1–D14, modified by the weights as shown in the Table 2. In each time period, the addition is made only for the aimed data which is in its printing status. The sum is zero at its lowest value (all "not-printing" reference data) and ·536 at its largest value (all "printing" reference data).

Figures 5, 6:
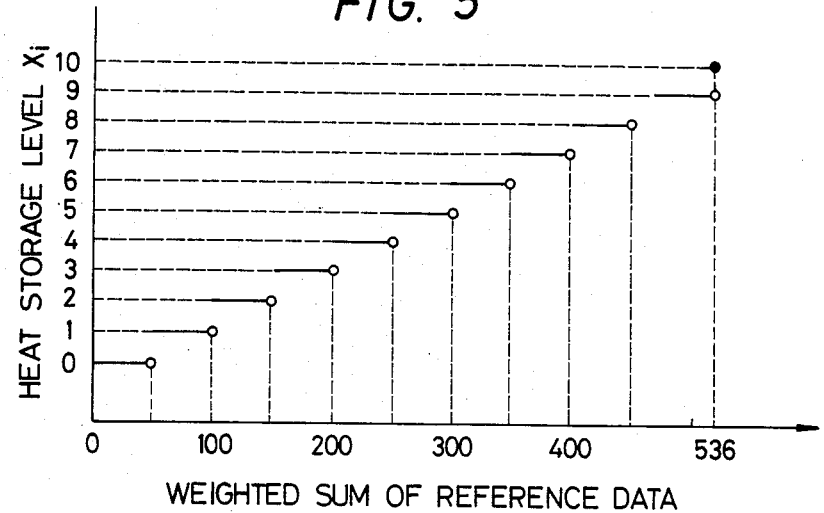

FIG. 5 shows the relationship between the sum and the heat storage level Xi. The Xi calculator 14 is provided with a read only memory (hereafter called a "ROM") from which the heat storage level Xi is read out using the sum as address information. If the sum is between 0 inclusive and 50 exclusive, the heat storage level Xi is "0"; if the sum is between 50 inclusive and 100 exclusive, Xi is "1," etc. If the sum is between 450 inclusive to 536 exclusive, the level Xi is "9" and only when the sum is 536 does the heat storage level become "10." The sum 536 represents the case where the entire region occupied by the reference data D1–D14 (hereinafter referred to as the "reference region") is occupied by printing data.

The heat storage level Xi calculated in this manner is supplied to both an applied pulse width calculator 16 and an Xi−1 memory 17. The Xi−1 memory 17 stores the heat storage level Xi with respect to every aimed data and produces as Xi−1 the stored level Xi delayed by one line. The delayed heat storage level Xi−1 represents the thermal history of the thermal head. The heat storage level Xi−1 is also supplied to the applied pulse width calculator 16. Calculator 16 contains a ROM from which the applied pulse width Ti is read out with heat storage levels Xi and Xi−1 providing the address information.

FIG. 6 represents one possible arrangement for the contents of the ROM in the applied pulse width calculator 16. The duration or time width of an applied pulse for printing the aimed data D0 in FIG. 4 is set at values from 1.0 ms to 0.4 ms in 0.1 ms intervals. When both the heat storage level Xi and Xi−1 represent the lowest level "0," the applied pulse width Ti acquires its longest value 1.0 ms. As the heat storage levels Xi increase, the applied pulse widths Ti correspondingly decrease. The shortest value of the applied pulse width Ti is 0.4 ms which occurs when both the heat storage levels Xi and Xi−1 are large.

When Xi and Xi−1 both have their largest value, "10," the present reference region and the previous line are composed entirely of printing data. If this occurs, the aimed data D0 is found in a solid region and it becomes necessary to correct the heat energy for printing solid black so the applied pulse width Ti is increased to 0.6 ms. Thus, when the aimed data D0 moves in the solid black region, the applied pulse width Ti is increased so that sufficient recording density can be obtained.

Normal heat storage correction is thereby effected when the aimed data D0 moves in a main scanning direction of a reading element toward reading a picture and enters a solid black region. Excessive thermal energy is not applied at the edge portion of printing portion which changes from a white portion to a black one, so as to ensure proper distinction at that point. When the aimed data D0 moves in the picture reading direction and comes away from the solid black region, the proper distinction in the edge portion of printing pattern can be similarly ensured. This is so even for a Chinese character composed of many strokes or a printing pattern composed of meshed points.

A pulse width signal 18 representing the applied pulse width Ti calculated by the applied pulse width calculator 16 is supplied to a thermal head drive circuit and an applied pulse width is set for every picture element with respect to the printing data.

Figure 7:
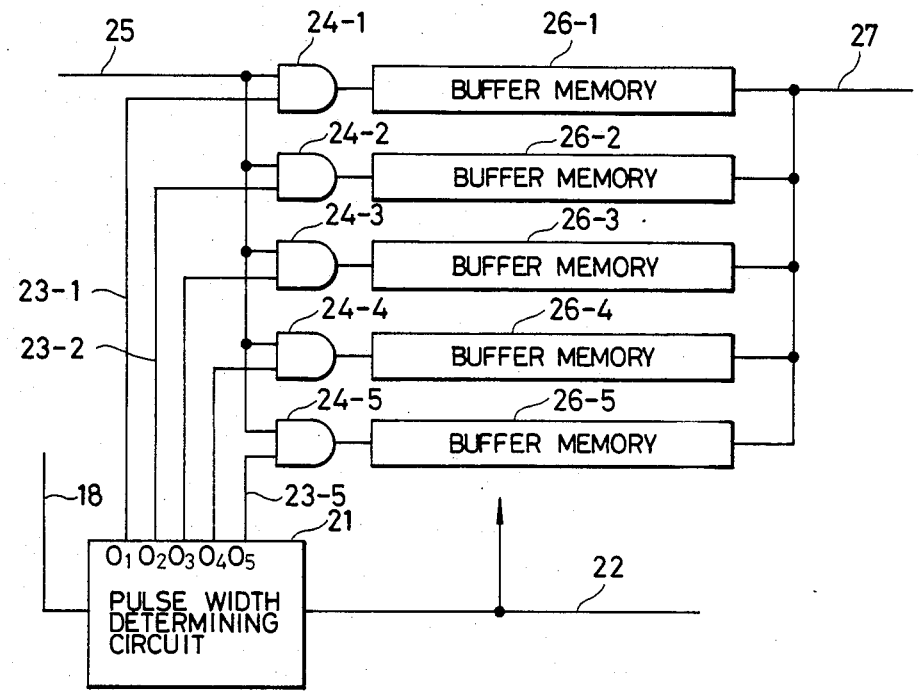

FIG. 7 shows a possible circuit arrangement of an applied pulse width setting section for this purpose. Pulse width determination circuit 21 of this pulse width setting circuit receives pulse width signal 18 in synchronism with clock signal 22 for sequential picture elements and produces from the output ternmals O1–O5, first through fifth gate control signals 23-1 to 23-5 in accordance with the pulse width. The pulse width determination circuit 21 divides the applied pulse width Ti into seven stages from 0.4 ms to 1.0 ms and adjusts the quantity of heat generation by the heater element.

When the applied pulse width is 0.4 ms, only the first gate control signal 23-1 is at an H (high) level; when the pulse width is 0.7 ms, the first through third gate control signals 23-1 to 23-3 are at an H level. When the pulse width is 0.8 ms, the first, third and fourth gate control signals 23-1, 23-3, 23-4 are at an H level; when the pulse width is 0.9 ms, the first through fourth gate control signals 23-1 - 23-4 are at an H level. When the pulse width is 1.0 ms, the first, second and fifth gate control signals 23-1, 23-3, 23-5 are at an H level.

These gate control signals 23-1 through 23-5 are each respectively applied to one input of a different one of five 2-inputs AND gates 24-1 to 24-5. AND gates 24-1 to 24-5 are also supplied with picture data 25 which is delayed by a circuit (not shown) which imparts a delay corresponding to the pulse width signal 18 for each heater element. For instance, when the signal "1" (printing data) is supplied as the picture data 25 and has an applied pulse width Ti of 0.7 ms, an output signal "1" is produced from each of the first through third AND gates 24-1 to 24-3, while an output signal "0" is produced from AND gates 24-4 and 24-5. These output signals are respectively applied to five buffer memories 26-1 to 26-5 which correspond respectively to the AND gates 24-1 to 24-5. After picture data 25 for one line is supplied to AND gates 24-1 to 24-5, the printing data for one line outputted from those AND gates are stored as pulse width data in buffer memories 26-1 to 26-5.

Figure 8:
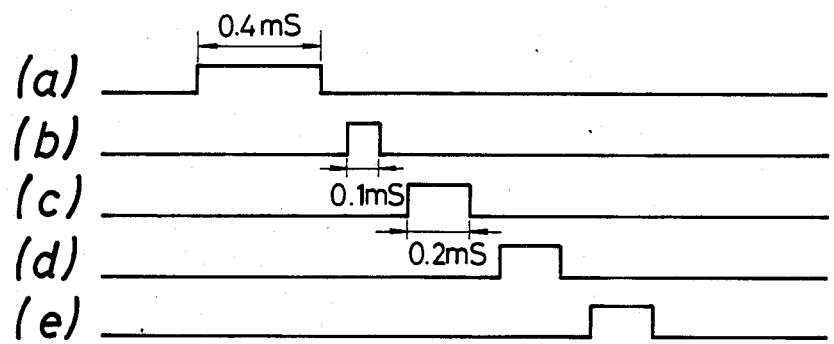

The stored data are supplied as pulse width control data 27 to a shift register latch circuit (not shown) at the thermal head. In the shift register latch circuit, the contents of the first buffer memory 26-1 are set in a shift register provided therein and the printing is made with a voltage applied for 0.4 ms as shown in FIG. 8(a). Then, the contents of the second buffer memory 26-2 are set in the same shift register and printing is made with an applied voltage for 0.1 ms, as shown in FIG. 8(b). The same applies to the following as the contents of the third through fifth buffer memories 26-3 to 26-5 are successively set in the shift register and the voltage application is performed for 0.2 ms in each case as shown in waveforms (c) to (e) in FIG. 8. Consequently, in a heater element which performs printing with a 0.7 ms pulse width, for instance, electric conduction is affected by the waveforms (a) to (c) in FIG. 8 so that the heater element is heated to a desired temperature.

In the previous embodiment, the fourteen reference data D1–D14 are disposed in the reference region as shown in FIG. 4. In order to judge whether the picture data for the region surrounding aimed data D0 is actually a solid portion, the reference region can be extended but this complicates the calculation of heat storage status for the aimed data. Thus, reference data considerably distant from the aimed data are generally disregarded because of their small contribution rate for heat storage. However, without information about the reference data whose heat storage conditions were disregarded, even if the heat storage conditions are grouped by level as shown in FIG. 5, it becomes extremely difficult to determine the printing dot exclusive possession rate accurately.

Figure 9:
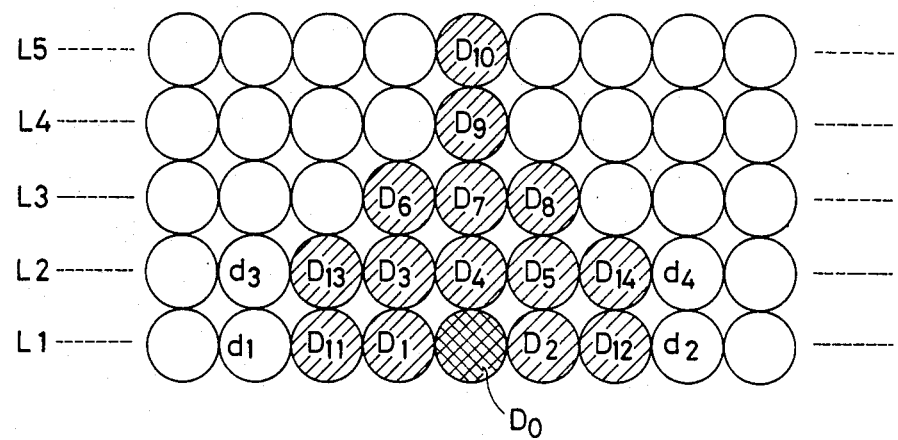
FIG. 9 is a diagram showing the arrangement of picture data in a reference region for a second embodiment of the invention.

This problem is overcome by another embodiment of the invention. FIG. 9 shows the reference region for this second embodiment. In the reference region, there are four solid judgment data d1–d4 in addition to the fourteen reference data D1–D14 described above for calculating the heat storage conditions. These data d1–d4 are each adjacent to a different one of the furthest reference data D11–D14 on the data rows L1 and L2, which are the present and immediately preceding printing lines respectively. The solid judgment data d1–d4 are used only to test for the printing dot exclusive possession condition by judging whether the solid judgment data are printing data or non-printing data.

Figure 10:
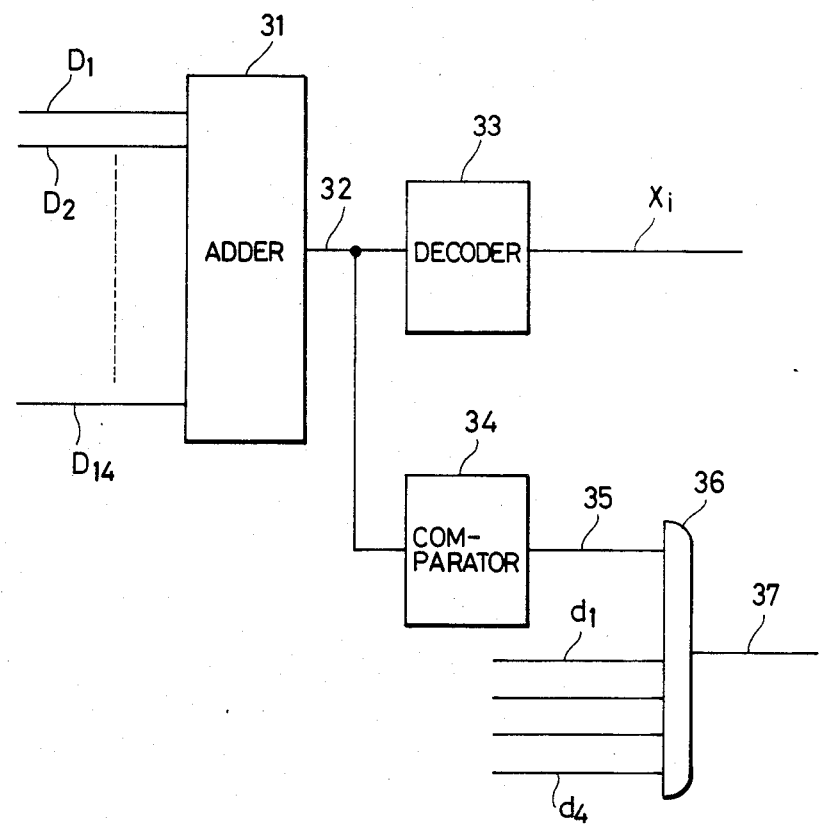
FIG. 10 is a block diagram showing the portion of the circuit of the heat storage correction apparatus in the second embodiment.

FIG. 10 shows a portion of the heat storage correction apparatus for the second embodiment. An Xi calculator similar to calculator 14 in the previous embodiment contains an adder 31 for adding the reference data D1–D14 modified by weights shown in Table 2.

The sum 32 from adder 31 is supplied to both decoder 33 and comparator 34. Decoder 33 produces a heat storage level Xi which is classified into ten steps shown in accordance with the sum. The heat storage level Xi is then applied to both the applied pulse width calculator 16 and an Xi−1 memory 17, so that a pulse width signal 18 is generated, as shown in FIG. 3.

Comparator 34 compares the sum from adder 31 with a value corresponding to a heat storage level of "10" and produces a coincidence signal 35 having an H (high) level only when coincidence is detected. The coincidence signal 35 is applied to a 5-input AND circuit 36. The 5-input AND circuit 36 is also supplied with the solid judgment data d1–d4. The solid judgment data d1–d4 have an H level when they are printing data. AND circuit 36 produces a solid judgment signal 37 having an H level only when all the data in the reference region are printing data.

The solid judgment signal 37 is applied to a pulse width determination circuit 21 shown in FIG. 7 to control the pulse width of a gate control signal 23-1 produced from the output terminal $O_1$. When the solid judgment signal 37 has an L (low) level, the pulse width of the gate control signal 23-1 becomes 0.4 ms similar to the circuit in FIG. 3. On the other hand, when the solid judgment signal 37 has an H level, the pulse width of the gate control signal 23-1 is prolonged to 0.6 ms to provide that the correction of applied energy at the solid black portion is performed.

This and the previous embodiment affect correction of applied energy only for a solid black portion. It is not always necessary that all the data in the reference region be printing data (i.e., solid black) before there is variation in recording density (or temperature characteristic of a substrate of the thermal head or the size of the reference region). Even when the exclusive possession rate of printing data in the reference region region is not exactly 100%, but is nearly 100%, it may be advantageous to effect heat energy correction.

Figure 11:
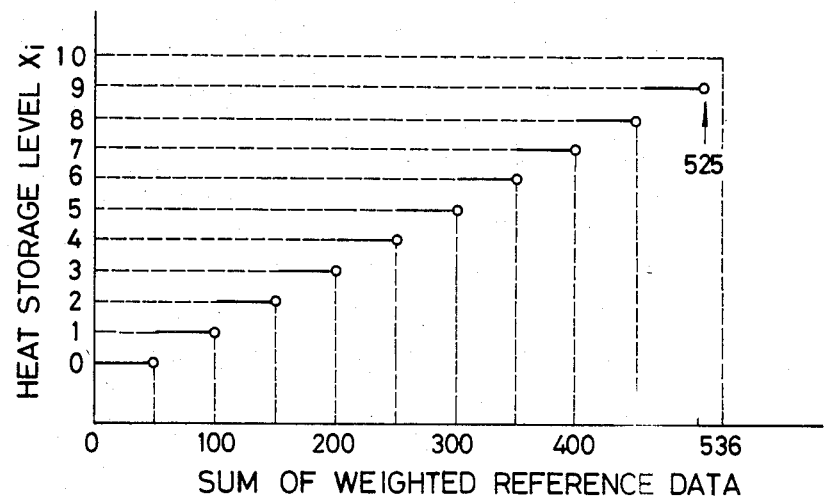
FIG. 11 is an explanatory diagram showing the contents of ROM in the Xi calculator in a third embodiment.

FIG. 11 shows the contents of the ROM in Xi calculator 14 of another embodiment for responding to the above-mentioned requirement. Although the heat storage level Xi becomes 10 only when the sum is 536 in the previous embodiments, in this embodiment Xi becomes 10 when the sum is greater than or equal to 525.

In this embodiment, the printing data exclusive possession rate in the reference region can be adjusted merely by changing or selecting the contents of the ROM provided in the Xi calculator 14. Moreover, it is not only possible to change the contents of the ROM but the reference area can also be enlarged in the manner described for the second embodiment.

In the previous embodiments, the heat storage condition was calculated by using the reference data in the surrounding region of the aimed data as well as the reference data from the previously printed aimed data. It is also possible to calculate the heat storage condition from just the reference data in the region surrounding the aimed data and the energy applied to the aimed data's heater element during the previous printing operation.

Figure 12:
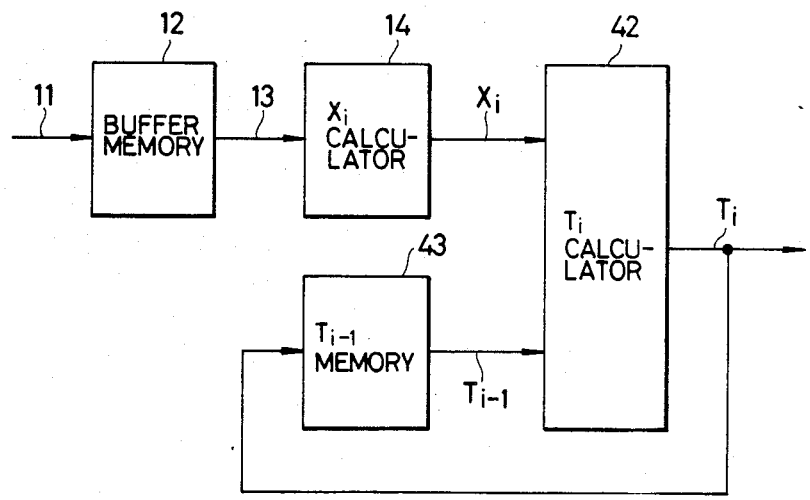
FIG. 12 is a block diagram showing the outline of heat storage correction apparatus in a fourth embodiment.

FIG. 12 shows a schematic arrangement of the heat storage correction apparatus for another embodiment of this invention. In the apparatus in FIG. 12, the heat storage level Xi is obtained by an Xi calculator 14 and supplied to a Ti calculator 42. The arrangement of the respective reference data in the Xi calculator 14 and the weighting for these reference data are effected in the same manner as calculator 14 in FIG. 4.

Figures 13, 14:
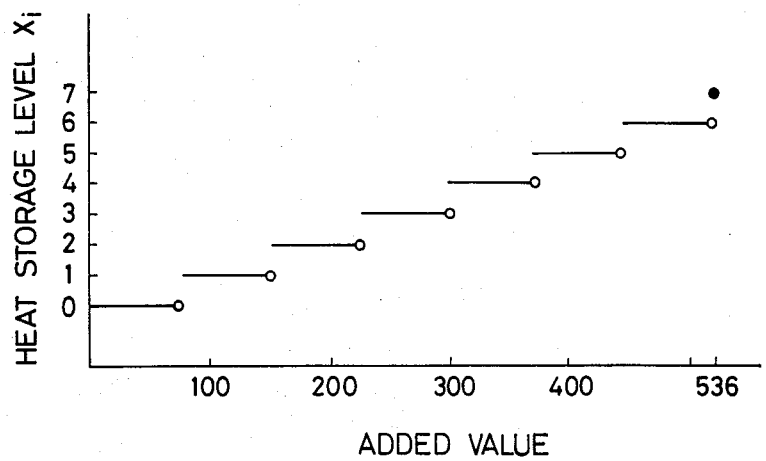
FIG. 13 is an explanatory diagram showing the contents of a ROM in the Xi calculator in the fourth embodiment.
FIG. 14 is an explanatory diagram showing the contents of a ROM for the Ti calculator in the fourth embodiment.

FIG. 13 shows the relationship between the sum and the heat storage level Xi in this embodiment. The sum is classified into eight stages of heat storage levels Xi, from "0" to "7," in accordance with the sum. For example, when the sum is between 440 inclusive and 536 exclusive, the heat storage level Xi is "6," and when the sum is 536, the heat storage level Xi becomes "7." When the heat storage level Xi is "7," all of the reference data D1–D14 are printing data.

Ti calculator 42 calculates the applied pulse width Ti for every heater element. The Ti calculator 42 produces an applied pulse width Ti from 1.0 ms to 0.3 ms at 0.1 ms intervals. The applied pulse width Ti is supplied not only to a pulse width setting section similar to that shown in FIG. 7 but also to a Ti−1 memory 43. The Ti−1 memory 43 contains the applied pulse width for every heater element delayed by one line and produces the thermal history data Ti−1 for Ti calculator 42.

Ti calculator 42 calculates the applied pulse width Ti by using the thermal history data Ti−1 and the heat storage level Xi as address information. FIG. 14 shows a possible representation of the contents of a ROM used for this purpose. As in previous embodiments, when the heat storage level Xi takes the largest value "7," the applied pulse width Ti is extended to 0.6 ms to provide the correction for printing solid black regions.

In some heat storage correction apparatus, correction may also be made for a solid portion by calculating the applied pulse width Ti taking into consideration variations in temperature of the substrate of the thermal head and resistance values of the respective heater elements. The reference region can also be expanded in the embodiment shown in FIG. 12 by effecting logical operations for picture data in the expanded portion. The result of this operation can be applied to the Ti calculator 42 or the Xi calculator 14. It is also possible to effect correction of applied energy in a solid portion other than the solid black merely by changing the contents of the ROMs.

Although the applied pulse energy is adjusted by changing the duration or time width of the applied pulse, the same adjustment can be performed by changing the amplitude of voltage of the applied pulse.

As described above, according to the present invention, the quantity of energy applied to a solid portion of a picture is increased in comparison with the rest of the picture, so that various patterns can be printed properly. Although the invention has been described in terms of preferred embodiments, the scope of the invention is not limited to those embodiments, but is instead determined by the appended claims and their equivalents.

What is claimed is:

1. A heat storage correction apparatus for determining the amount of energy to be applied to a plurality of heater elements in a thermal head for recording picture data, the one of said heater elements for which the apparatus currently determines the amount of applied energy being called an aimed data element, said apparatus comprising:

means for storing recording states for said plurality of heater elements based on said picture data;

means for calculating a heat storage level for said aimed data element from a first number of stored recording states;

means for judging the degree of solidity in the region of said picture data surrounding the portion corresponding to said aimed data element by using said heat storage level, for adjusting the level of energy to be applied to the aimed data element such that said energy level generally decreases in accordance with increasing solidity, and for increasing said energy level when said surrounding region is judged to be substantially solid; and means for setting the amount of energy for said aimed data element from said aimed data element energy level and the recording state for said aimed data element.

2. The apparatus in claim 1, wherein heat storage level calculating means and said judging, adjusting and increasing means each includes a ROM.

3. The apparatus in claim 1, wherein said setting means includes means for generating substantially fixed amplitude pulses to be applied to said aimed data element, the width of said pulses being proportional to the set amount of energy for said aimed data element.

4. The apparatus in claim 3, wherein said judging, adjusting and increasing means further includes means, connected to an output of said generating means, for storing the width of the previous pulse for said aimed data element.

5. The apparatus in claim 1, wherein said judging, adjusting and increasing means further includes means for storing the previous heat storage level of the aimed data element to help judge whether said surrounding region is substantially solid.

6. The apparatus in claim 1, wherein said heat storage level means includes means for calculating said aimed data heat storage status based upon a first predetermined number of said recording states of heater elements surrounding said aimed data element and wherein said judging, adjusting and increasing means includes means for analyzing a second number of said recording states to determine the degree of solidity.

7. A method for determining the amount of energy to be applied to an aimed data element surrounded by a plurality of heater elements in a thermal head for recording picture data, said method comprising the steps of:

calculating the heat storage level for said aimed data element based on the recording states of a first number of elements surrounding said aimed data element, said recording states corresponding to said picture data;

judging the degree of solidity in the region of said picture data surrounding the portion of said picture data corresponding to said aimed data element using said heat storage level;

adjusting the level of energy to be applied to said aimed data element such that said energy generally decreases in accordance with increasing solidity;

increasing said energy level for said aimed data element when said surrounding region is judged to be substantially solid; and setting the amount of energy for said aimed data element from said aimed data energy level and the recording state for said aimed data element.

8. The method of claim 7, wherein said heat storage level calculating step includes the step of reading out said level from a first ROM, and wherein said judging, adjusting and increasing steps include the step of outputting said energy level from a second ROM.

9. The method in claim 7, wherein said energy setting step includes the step of generating a substantially fixed amplitude pulse to be applied to said aimed data element by adjusting the width of said pulse to be proportional to said energy level.

10. The method of claim 9, including the steps of:
storing the width of the previous pulse for said aimed data element; and
using said stored previous pulse width in generating said fixed amplitude pulse.

11. The method in claim 8 further including the steps of:
storing the previous heat storage status for the aimed data element; and
using said stored previous heat storage status in judging the solidity of said surrounding region.

12. The method in claim 7, including the steps of:
calculating the heat storage level for said aimed data element using the recording states of a first predetermined number of said elements; and
judging the degree of solidity using the recording states of a second predetermined number of elements.

* * * * *